US011524524B1

(12) United States Patent
Niebuhr et al.

(10) Patent No.: US 11,524,524 B1
(45) Date of Patent: Dec. 13, 2022

(54) HUB AND ROTOR SEPARATOR AND METHOD

(71) Applicant: F.A.S. Engineered Solutions, LLC, West Salem, WI (US)

(72) Inventors: Scot Niebuhr, West Salem, WI (US); Forrest Niebuhr, Brodhead, WI (US); Robert Gadow, Brodhead, WI (US); Edward Hilstad, Rockford, IL (US)

(73) Assignee: F.A.S. Engineered Solutions, LLC, West Salem, WI (US)

( * ) Notice: Subject to any disclaimer, the term of this patent is extended or adjusted under 35 U.S.C. 154(b) by 318 days.

(21) Appl. No.: 16/571,268

(22) Filed: Sep. 16, 2019

(51) Int. Cl.
*B60B 31/00* (2006.01)

(52) U.S. Cl.
CPC .......... *B60B 31/00* (2013.01); *B60B 2320/10* (2013.01); *B60B 2900/541* (2013.01)

(58) Field of Classification Search
CPC ..... B60B 31/00; B60B 2320/10; B23P 19/02; B23P 19/025; B23P 19/027
USPC ......... 29/244, 245, 251, 252, 258, 259, 260, 29/261
See application file for complete search history.

(56) References Cited

U.S. PATENT DOCUMENTS

| | | | |
|---|---|---|---|
| 2,003,648 A * | 6/1935 | Frye | B25B 27/026 29/259 |
| 3,337,943 A * | 8/1967 | Powell | B25B 27/026 29/252 |
| 4,908,925 A | 3/1990 | Johnson | |
| 8,347,474 B2 | 1/2013 | Oachs et al. | |
| 8,745,832 B2 | 6/2014 | Barrios et al. | |
| 2004/0143949 A1 | 7/2004 | Christopher | |
| 2005/0177988 A1 | 8/2005 | Williams | |
| 2011/0179616 A1 * | 7/2011 | Oachs | B25B 27/023 29/259 |
| 2017/0037873 A1 | 2/2017 | VanWinkle et al. | |

* cited by examiner

*Primary Examiner* — Christopher M Koehler
(74) *Attorney, Agent, or Firm* — Anthony J. Bourget

(57) ABSTRACT

Methods and devices and clamps for separating a hub from a rotor of a rotor/hub assembly, including a platform having a top portion to receive the rotor and an opening to allow a pusher from a jack or press to pass through the opening, and a set of clamps configured to hold the rotor in a fixed position with respect to the platform while the pusher pushes through the opening to contact the hub to separate the hub from the rotor. The clamps are generally C-shaped and devoid of moving parts and slip inwardly upon the platform to hold the rotor while the pusher pushes upward to release the hub from the rotor, and the clamps have a slot to allow the clamps to rotate and store out of position in a non-use mode.

16 Claims, 6 Drawing Sheets

HUB AND ROTOR SEPARATOR AND METHOD

BACKGROUND OF THE INVENTION

1. Field of the Invention

The present invention relates to methods and devices for separating a component from an assembly, and more particularly methods and devices for removing a rotor from a rotor/hub assembly.

2. Background Information

A rotor/hub assembly is commonly used in trucks, automobiles and other vehicles. A rotor, such as a brake rotor is often connected to a hub, such as a wheel hub, to create a rotor/hub assembly. Sometimes the rotor must be removed from the assembly. Typically the rotor mates with an end of the hub via a spline connection. Separating the rotor from the hub requires forcibly sliding the rotor outward from the splined connection. Separation can be especially difficult where the rotor and hub have been connected for a long time and over normal or severe conditions. The separation is difficult sometimes due to use of different materials, expansion of materials, oxidation/rust, wear and tear or other factors. Service mechanics will often use hammers and studs and attempt to pound or pry-apart the components. The rotor/hub assembly is often difficult to hold and applying force to one portion of the assembly can result in twisting or turning of the components or assembly, making application of a separating force difficult and/or inconsistent. Some examples of inventions to assist in separation of a component from an assembly or a rotor from a hub include those shown in patents such as U.S. Pat. Nos. 6,925,696, 8,347,474, 8,745,832, and U.S. Patent Application No. 2004/0143949. While these and other inventions have certain benefits, there is room for improvement.

SUMMARY OF THE INVENTION

Heretofore devices for separating or attempting to separate a rotor from a hub of a rotor/hub assembly have generally approached the problem by pulling, prying or pounding the rotor away from the hub while holding onto the hub, or pulling or pressing at portions of the rotor to separate the rotor from the hub, or pulling or pounding against portions of the hub while holding the rotor, etc. Grasping the assembly while separating the parts is difficult and time-consuming. Applicants have achieved an efficient device and method for separating the rotor/hub assembly, which includes firmly holding the rotor while pushing against a terminal edge of the hub through the opening of the rotor, and doing so by applying a force around the entire terminal end of the hub and while firmly holding the rotor at various positions of the rotor.

In one aspect the invention includes a device having a platform on which is received a rotor/hub assembly to be separated, the platform having an opening to allow a pusher to pass therethrough to contact an entirety of a terminal end or edges of the hub, and clamps positioned to firmly hold the rotor in a fixed relationship with respect to the platform so that pushing of the pusher against the hub separates the hub from the rotor. In certain aspects the clamp aspect of the invention includes a clamp having a top arm and a bottom arm extending from the clamp body and configured to contact an upper portion of the rotor and a lower portion of the platform to hold the rotor in position while the pusher pushes the hub to separate the hub from the rotor. In aspects the clamp body, top arm and bottom arm are made of a single piece of metal, such as steel.

In a further aspect the invention includes a device for separating a hub from a rotor where the device includes a platform having a top portion to receive the rotor, the platform having an opening, a press positioned on the device below the platform and coupled to a pusher oriented to pass through or into the opening to contact the hub at a terminal end portion of the hub and a plurality of clamps to hold the rotor in fixed position with respect to the platform while the pusher passes through the opening of the platform and a central opening in the rotor to force the hub to separate from the rotor.

In a further aspect the invention includes a method of separating a component from an assembly, such as separating a hub from a rotor, including holding the rotor in a fixed position with respect to a platform having an opening, and utilizing a press or a jack to force a pusher through the opening and within a central opening of the rotor and against the hub to separate the hub from the rotor.

In a further aspect the invention includes a clamp arranged in a general C-shape configuration and having a top arm and bottom arm defining a mouth and a taper provided at inside edges of the mouth and together with a slot passing through the clamp for receiving a clamp rod, the slot being elongated to accommodate sliding action of the clamp while connected to the clamp rod. In a further aspect the clamp includes a gap communicating with the slot for selective insertion of the clamp onto a clamp rod.

The above partial summary of the present invention is not intended to describe each illustrated embodiment, aspect, or every implementation of the present invention. The figures and detailed description and claims that follow more particularly exemplify these and other embodiments and further aspects of the invention.

BRIEF DESCRIPTION OF THE DRAWINGS

The invention may be more completely understood in consideration of the following description of various embodiments of the invention in connection with the accompanying drawings, in which.

Figure 1:
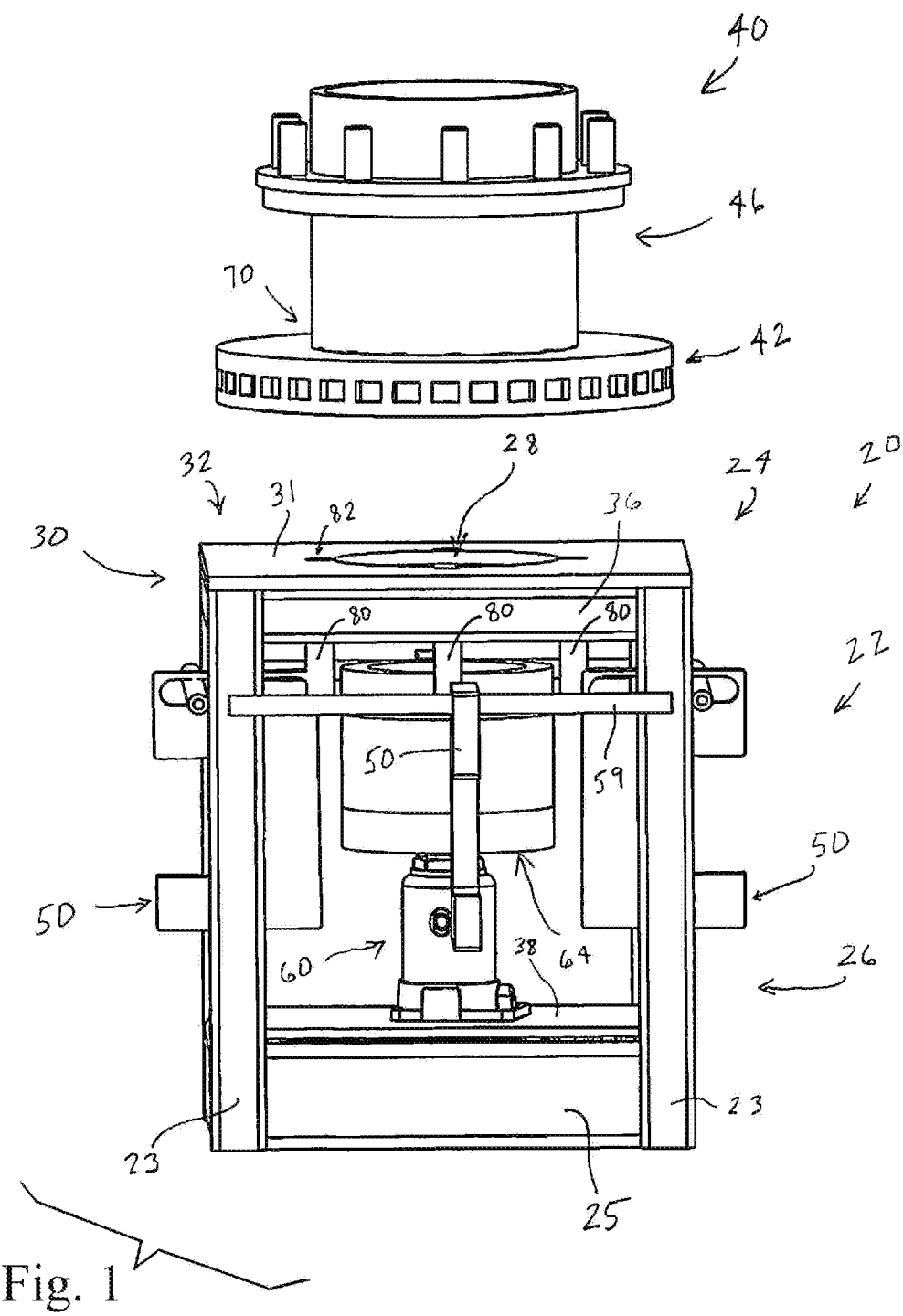
FIG. 1 is a slight perspective view of a device for separating a hub from a rotor of a rotor/hub assembly in accordance with one aspect of the invention and shown in conjunction with a representative rotor/hub assembly.

While the invention is amenable to various modifications and alternative forms, specifics thereof have been shown by way of example in the drawings and will be described in detail. It should be understood, however, that the intention is not necessarily to limit the invention to the particular embodiments, aspects and features described. On the contrary, the intention is to cover all modifications, equivalents, and alternatives falling within the spirit and scope of the invention and as defined by the appended claims.

DETAILED DESCRIPTION OF THE INVENTION

Referring to FIGS. 1-7, aspects of the hub and rotor separator device and methods are shown. FIG. 1 shows a hub and rotor separator device 20 in a storage or non-use mode, and depicts an example or representative rotor/hub assembly 40 positioned above device 20. Device 20 and assembly 40 presented in the figure are shown in a generally front view or slight perspective orientation for clarity. The rotor/hub assembly 40 is a typical assembly including a rotor 42 positioned at an end of hub 46. Assembly 40 is commonly used in vehicles such as trucks or other vehicles. Sometimes the rotor 42 needs to be separated from the hub 46 for replacement or repair of the rotor 42 and/or hub 46. A rotor 42 is often used as a component of a vehicle or truck braking system, where calipers pinch upon outer sides of the rotor 42 to cause slowing or stopping of rotation of the assembly 40. Often the rotor 42 will experience wear and tear and require replacing. The rotor 42 commonly experiences high heat and other conditions. Rotor 42 is typically secured to hub 46 via a spline connection where the rotor 42 slides upon an end of the hub 46. To separate the rotor from the hub often requires applying a force to the rotor 42 so that the rotor 42 may be pulled or pried outward from the hub 46.

In the present invention, the rotor 42 is held in position while the hub 46 is pushed away from the rotor 42 for separation of the rotor/hub assembly. For instance, the assembly 40 is placed upon device 20, particularly at or on a platform 30. In one aspect platform 30 is part of a stand 22 and is positioned at an upper portion 24 of stand 22. In general, a clamp 50 or clamps 50 hold rotor 42 while a press 60 pushes a pusher 64 upward through an opening 28 in the platform 30. As the pusher 64 inserts into or through the opening 28, the pusher 64 contacts a terminal edge, for instance, of the hub 46. Force is applied via the press 60 such that the pusher 64 pushes the hub 46 upward while the clamps 50 hold rotor 42 in place. As the pusher 64 pushes upward on the hub 46, the hub 46 slides upward (in the direction of Arrow A shown in FIG. 3) and disconnects from the rotor 42. The disconnected hub 46 will rest upon the rotor 42 or fall from platform 30. Thereafter the rotor 42 may be removed from device 20 by retracting the clamps 50. Sometimes a large amount of force is required to separate the hub 46 from the rotor 42. The force is applied in one example via press 60. Applying the force using the present device 20 results in separation of the hub 46 from the rotor 42 within seconds of applying the force. For instance, in a typical application the hub 46 is separated from the rotor 42 in about 3-5 seconds. The separation time may vary based on the circumstances. Separation in such short time period and with all the separation accomplished without human physical exertion by using device 20 is a significant improvement over prior systems which sometimes may take several minutes (or even hours or days) and significant physical labor to achieve a separation.

In further reference to FIG. 1, device 20 includes a stand 22 having an upper portion 24 and a lower portion 26. A platform 30 is positioned at upper portion 24. In one aspect, platform 30 includes a top plate 31 having an opening 28. In one aspect opening 28 is circular and configured to allow a pusher 64 to pass upward through the opening 28. Opening 28 may be of different shapes and sizes. In further aspects, platform 30 includes top supports 36, such as support tubes which are oriented generally horizontally and support top plate 31. In one aspect, platform 30 and top support 36 is held at upper portion of stand 24 by legs 23. Legs 23 project generally vertically upward from bottom supports 25 which in some aspects comprise support tubes which are oriented generally horizontally. In one aspect, four top support tubes 36 form a perimeter of platform 30 while also being an upper portion 24 of stand 22. In one aspect support tube 36 has a length of about 14 inches and a width and a height of about 2 inches and material thickness of about ¼ inch. The components of stand 22 and platform 30 in one aspect are made of metal, such as steel or other metal, and are welded together or otherwise connected. Platform 30 has top portion 32 which receives the rotor 42 of the rotor/hub assembly 40 and includes opening 28 to allow pusher 64 to pass therethrough to contact the hub 46 of the assembly 40. A clamp 50 or multiple clamps 50 are used to hold rotor 42 into position while pusher 64 pushes upward against hub 46. In further or alternative aspects top plate 31 is optional and the rotor 42 may be placed direction on platform 30 comprising top support tubes 36. In such case, opening is defined by the support tubes 36.

Figure 2:
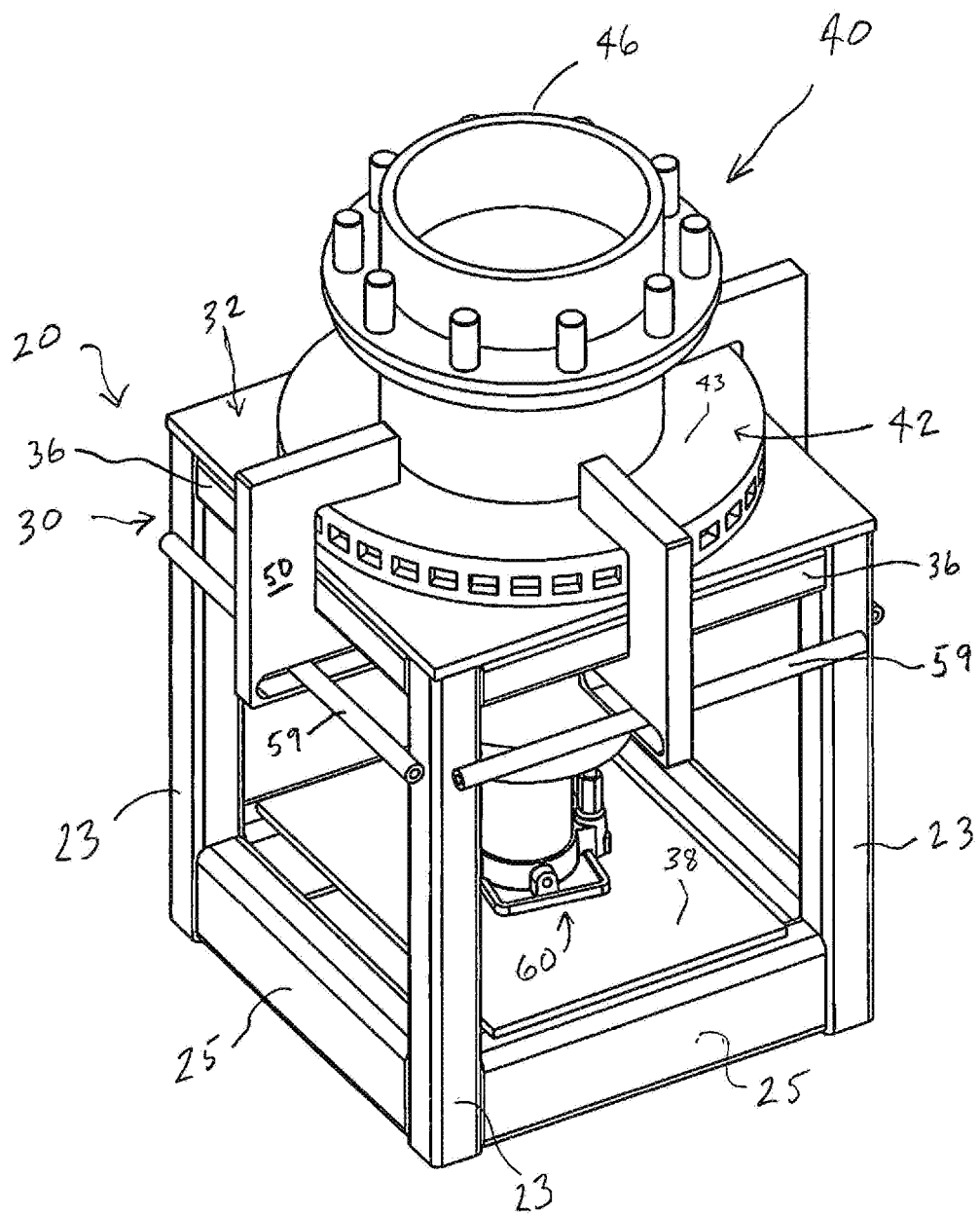
FIG. 2 is a perspective view of the device of FIG. 1 with the representative rotor/hub assembly situated thereon.
Figure 3:
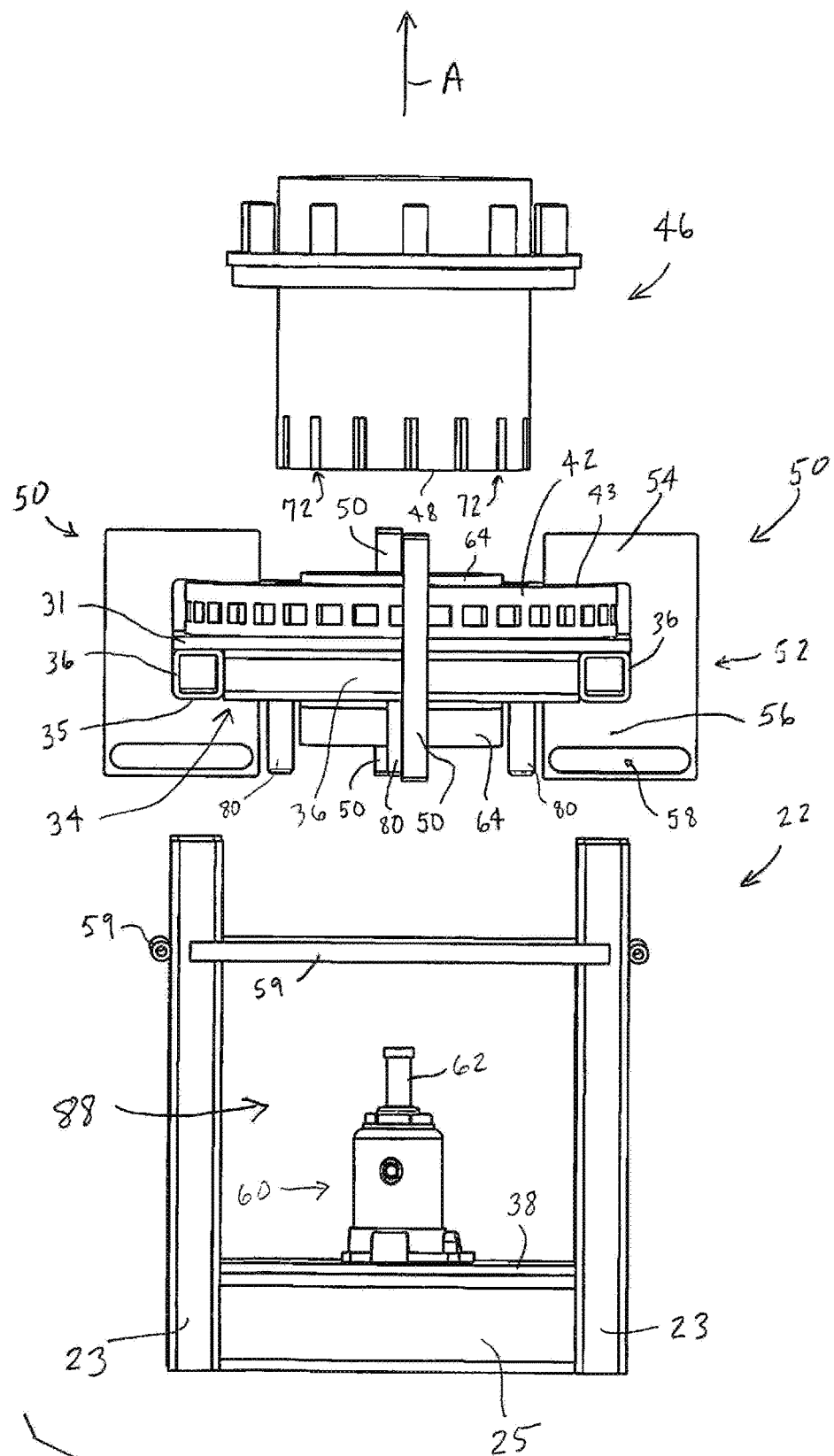
FIG. 3 is a partially exploded slight perspective view of the device of FIG. 1 with the representative rotor/hub assembly in exploded view.
Figure 4:
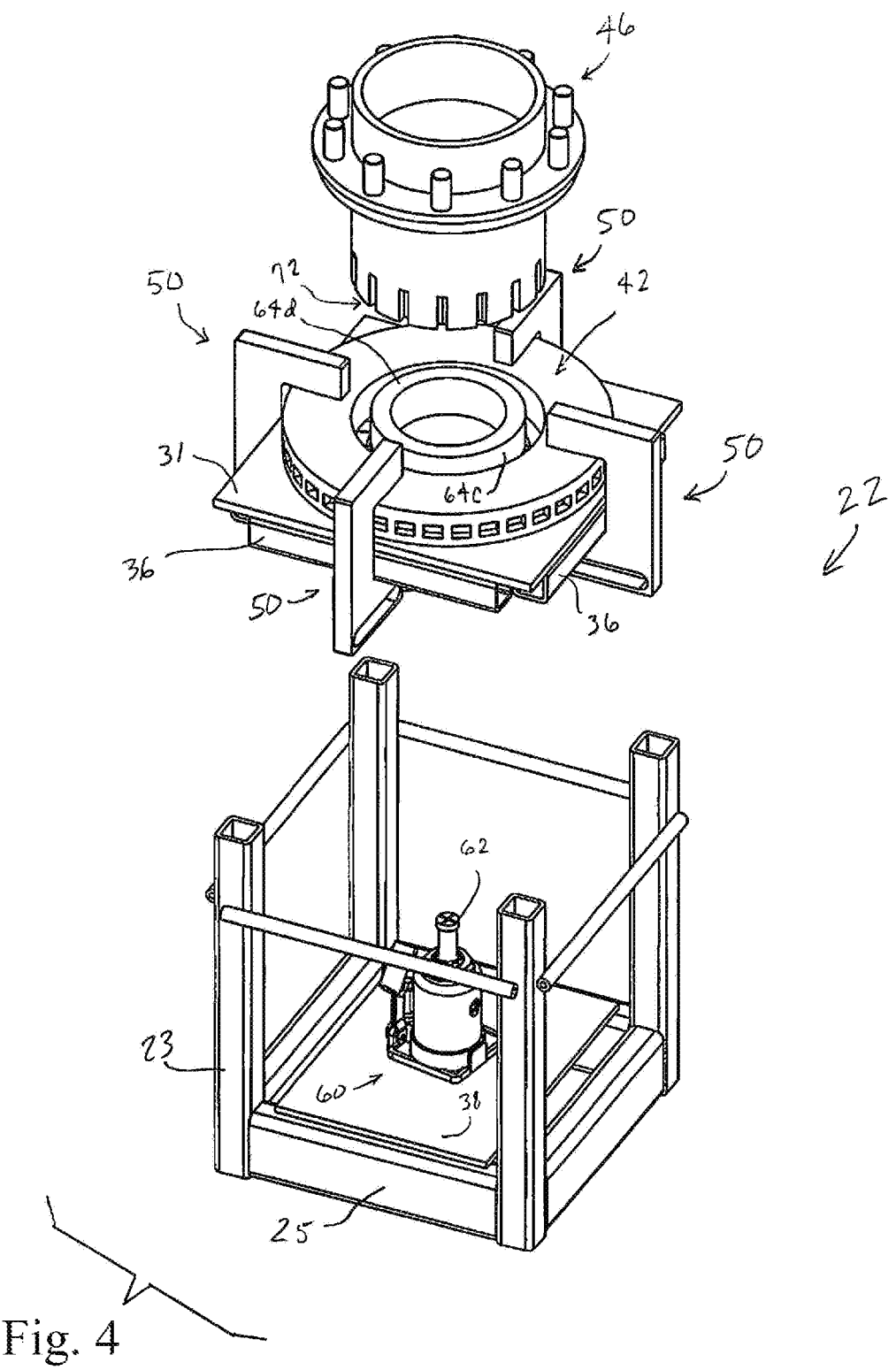
FIG. 4 is a partially exploded perspective view of the device of and assembly of FIG. 3.
Figure 5:
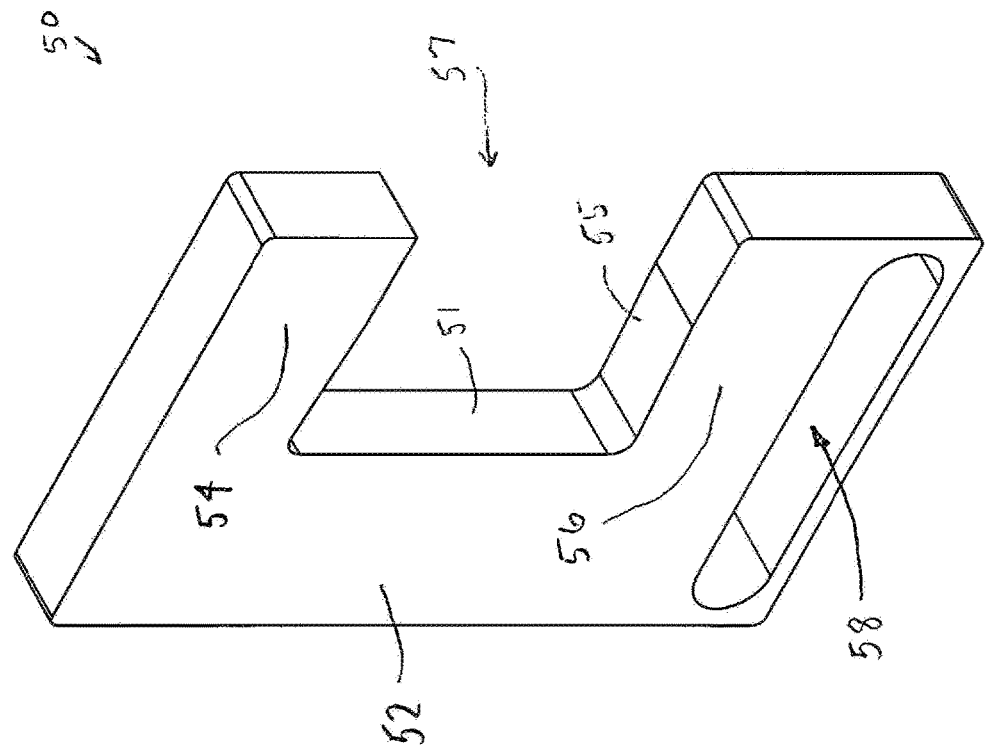
FIG. 5 is perspective view of a component in accordance with a further aspect of the invention.

FIG. 2 is a perspective view of the device 20 of FIG. 1 upon which is positioned assembly 40. FIG. 3 is a partially exploded perspective view of the device 20 and assembly shown in FIG. 2. FIG. 4 is a partially exploded view of the device 20 and assembly 40 of FIG. 3. FIG. 5 is a perspective view of a clamp component 50 in accordance with a clamp aspect of the invention and for use with the device aspect of the invention. Assembly 40 is received at platform 30 such that the hub 46 is oriented over the opening 28 and in alignment with pusher 64. A clamp 50 or multiple clamps 50 are positioned at platform 30. In one aspect, clamp 50 includes a clamp body 52, a top arm 54 extending from the body 52 and a bottom arm 56 extending from the body 52. The clamp 50 is constructed and positioned such that the top arm 54 abuts a top portion 43 of the rotor 42 while the bottom arm 56 abuts a bottom portion 34 (See FIG. 3) of platform 30. In some aspects, where the rotor 42 has experienced wear, or in cases of rotors having narrow thickness, there will be a gap or a slight gap between the rotor 42 and top arm 54 and/or between bottom arm 56 and bottom portion 34 of platform 30. While pusher 64 is applying a force against hub 46, however, rotor 42 will move slightly upward to close any gaps such that top arm 54 will abut top portion 43 of rotor while bottom arm 56 abuts bottom portion 34 of platform 30. In one aspect, four clamps 50 are used to hold rotor 42. For instance, where stand 22 includes four sides, such as where there are four top supports 36 forming platform 30, four separate clamps 50 are used to hold rotor 42. A clamp 50 (or multiple clamps) may be positioned at each side of platform 30 as shown. In this manner, clamps 50 uniformly hold rotor 42 into position so that the rotor 42 maintains a relatively horizontal orientation and does not tip or substantially tip or rock when a separating force is applied.

Figure 6:
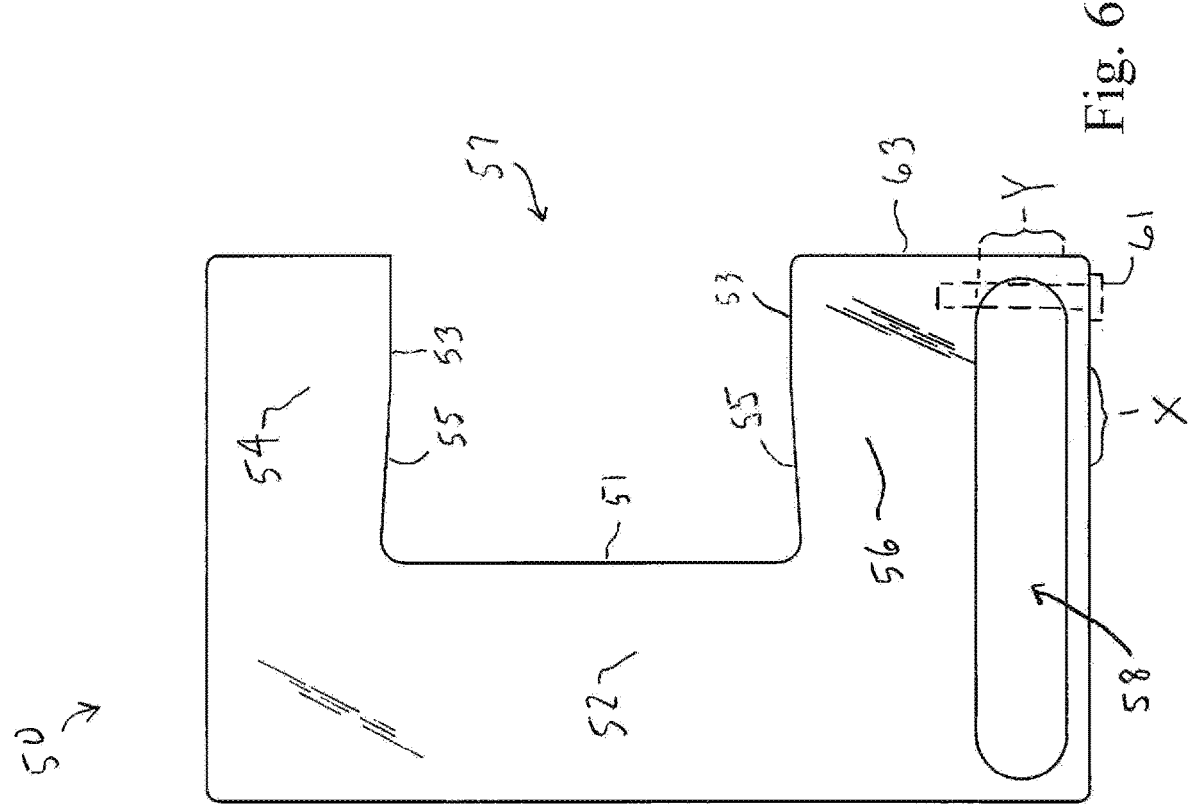
FIG. 6 is a front view of the component of FIG. 5.

With reference to FIG. 5 and FIG. 6, in one aspect clamp 50 is a C-shaped clamp and made of metal such as steel. Clamp 50 in one aspect has a thickness of 1 inch, a length of between 9 and 10 inches, and a width of between 5 and 6 inches. The arms 54, 56 define a mouth 57 which mouth 57 inserts over an edge of platform 30 and an edge of rotor 42. Clamp 50 is made of a unitary piece of metal and is capable of withstanding great forces applied against the inside edges 53 of the top arm 54 and bottom arm 56 within mouth 57. Particularly, the clamp body 52, top arm 54 and bottom arm 56 are made of a single piece of metal. The top arm 54 and the bottom arm 56 are separated by a fixed distance and do not move or are unadjustable. In one aspect, mouth 57 includes edges 53 which have a taper 55 or slight taper 55 to accommodate ease of insertion (or removal) of mouth 57 upon platform 30 and rotor 42. For instance, the internal edge 53 along taper 55 widens internally to provide a larger mouth opening internal the clamp 50. In a further aspect, claim 50 includes a slot 58 passing through the thickness of the clamp 50 and configured to receive a clamp rod 59 therein. Clamp rod 59 is connected to and spans across legs 23 and supports clamp 50. In a storage or non-use mode, clamp 50 hangs downward from clamp rod 59 as shown in FIG. 1 for convenient storage. Slot 58 allows clamp 50 to slide along and about rod 59 so that clamp 50 may be adjusted upward to a clamping or operation mode as shown in FIG. 2. Clamp 50 is slid or inserted at platform 30 toward opening 28 so that a bottom 51 of mouth 57 of clamp 50 abuts platform 30 or top plate 31. Slot 58 also allows clamp 50 to slide along clamp rod 59 longitudinally to accommodate a longitudinal adjustment of clamp 50 if needed. Slot 58 also allows for clamp 50 to be moved or adjusted about a generally vertical axis to accommodate insertion or removal of a clamp 50 onto or from platform 30 and rotor 42. Slot 58 has an opening such that clamp 50 may rotate freely about clamp rod 59. In one aspect clamp rod has a diameter of 0.75 inches and a length of about 17 inches and is welded to legs 23. The C-shaped (or U-shaped) orientation of claim 50 allows for swift and confident clamping action, with robust strength for peace-of-mind in operation of device 20 under great forces. Storing clamps 50 using clamp rods 59 allows for quick access and insertion of clamps 50, and eliminates misplacement and/or use of undesirable alternative clamps. The clamp 50 itself is a unitary object devoid of moving parts, and thus will not or is unlikely or less likely to fail when great stresses are applied. The use of four clamps 50 in combination hold rotor 42 into position while hub 46 separates from rotor 42. In other aspects a clamp 50 may include a top arm 54 or a bottom arm 56 which are adjustable with respect to each other.

In a further aspect, clamp 50 may include a slot 58 together with an access gap (shown, for example at element X, or at element Y in FIG. 6) where a portion of bottom arm 56 is removed at gap X or Y to allow access to the slot 58. For instance, an access gap X or Y (where the clamp material is removed at those portions) will allow clamp 50 to be selectively inserted or removed from clamp rod 59. In such example clamp 50 is still a unitary clamp where clamp body 52, top arm 54 and bottom arm 56 are made of a single piece of metal. In such example the unitary clamp has no moving parts.

In a further aspect, a bolt 61 or other fastener may be used in conjunction with an access gap Y (or gap X), where the bolt 61 inhibits access to slot 58 from edge 63 when bolt 61 is inserted, and allows access to slot 58 from edge 63 when bolt 61 is loosened or removed from bottom arm 56. The gap X or Y, and bolt 61 may be positioned or oriented at different locations upon clamp 50. Such gap X or Y and bolt 61 accommodate selective removal and assembly of clamp 50 onto clamp rod 59 for replacement, repair, maintenance or storage of clamp 50, for instance. While this aspect includes a moving part such as a bolt or fastener, the moving part does not alter or adjust the position of the top arm 54 with respect to the bottom arm 56. The top arm 54 and bottom arm 56 maintain a fixed distance of separation.

Figure 7:
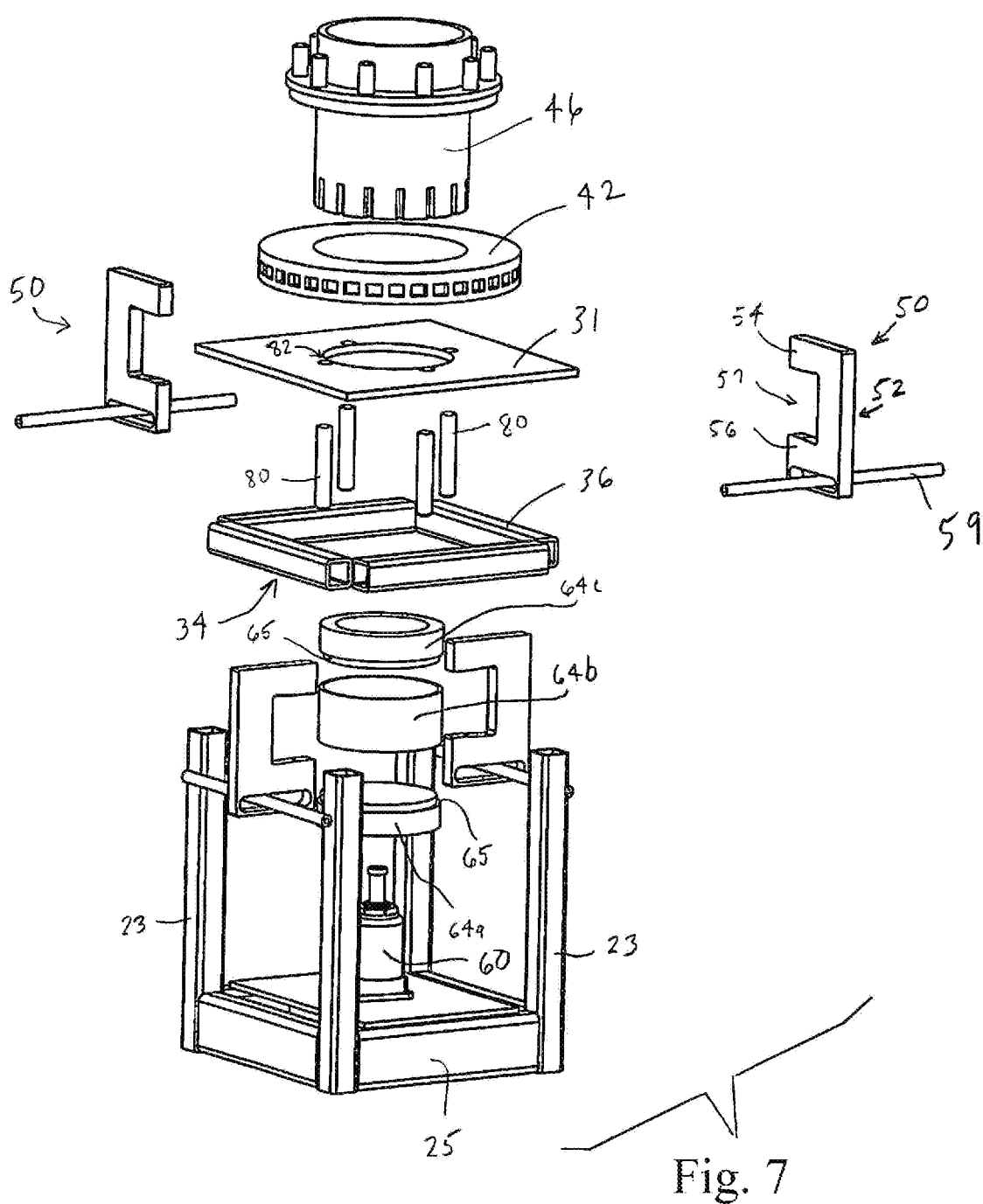
FIG. 7 is a partially exploded perspective view of the device of FIG. 1 with the representative rotor/hub assembly also in exploded view.

With further reference to FIGS. 1-4 and FIG. 7, device 20 includes a press 60 and pusher 64. FIG. 7 is an exploded perspective view of the device 20 and assembly 40 of FIG. 1. Press 60 in one aspect is a hydraulic press. Alterative types of cylinders or jacks or presses 60 including a pneumatic or pneumatic/hydraulic press may be used to impart a force upward upon hub 46. Press 60 may also be a mechanical jack or hand-operated type of jack or press. In one aspect press 60 includes a ram 62 which slides upward (and downward) and contacts pusher 64. In one aspect, pusher 64 includes a segment or multiple segments. For instance with respect to FIG. 7, pusher 64 includes a base segment 64a which engages directly with ram 62. Base segment 64a is generally disk shaped and includes a groove 65 (See FIG. 7) at a perimeter edge and is configured to receive a middle segment 64b. In one aspect, base segment 64a is made of steel and has a diameter of about 8 inches and thickness of about 2 inches. In one aspect base segment 64a includes a central impression or dimple configured to receive an end of the ram 62. A light chamfer may be included at or along the edges of segment 64a for safety in handling. Middle segment 64b in one aspect is cylindrical having a wall thickness which matches the groove 65. In further aspects middle segment 64b is a ring having a material thickness of about ⅛ inch and an outer diameter of about 8.5 inches and a width of about 3 inches. Middle segment 64b receives top segment 64c. Top segment 64c may also be cylindrical and in one aspect also includes a groove 65 at a perimeter edge configured to receive middle segment 64b. In one aspect top segment 64c has an outer diameter of about 8 inches. In one aspect opening 28 has a diameter of about 9 inches. Top segment 64c includes a terminal edge 64d. Terminal edge 64d is generally ring-shaped and is configured to abut with a terminal edge 48 (See FIG. 3) of hub 46.

As press 60 is activated, pusher 64, including top segment 64c at terminal edge 64d pushes upward against the terminal edge 48 of hub 46. The upward pressure applied to hub 46 causes hub 46 to separate from rotor 42. In one aspect, grooves 72 defined by an outer surface of hub 46 of a spline connection, slide upward along corresponding fingers defined by an inner edge surface of rotor 42 of the spline connection. Eventually due to force applied by press 60, the spline connection is overcome and the hub 46 is separated upward from the rotor 42. In one aspect, the grooves 72 slide upward from internally mated fingers of the rotor 42. In other aspects, the spline connection may include fingers positioned at the outer surface of hub 46 with grooves defined by an inner surface of the rotor 42. Use of ring shaped segments 64b, 64c focus the forces from press 60 along the terminal ring edge of the hub 46. The upward forces concentrated at such location, while holding rotor 42 in a fixed position, allows for an efficient sliding upward action of hub 46 for separation. In further aspects pusher 64 is a unitary piece and need not have separated segments such as segments 64a, 64b and 64c. In further aspects pusher 64 comprises two segments. Pusher 64 may comprise a single element, or in alternatives comprises multiple elements which operate together as pusher 64.

In further reference to FIG. 7, an alignment pin 80, or a series of alignment pins 80 are positioned at or adjacent to opening 28. Alignment pin 80 projects downward from platform 30 or top plate 31. In one aspect alignment pins 80 are cylindrical and have a longitudinal axis oriented along a direction of travel of the pusher 64 or generally along the direction of Arrow A. In one aspect, pins 80 are welded to top plate 31 through or at alignment holes 82 and finished (by grinding for instance) so that an upper edge of pin 80 aligns along a common plane (flush with) of a top of top plate 31. In one aspect top plate 31 is a rectangle or square shape having sides about 18 inches long and with a thickness of about ½ inch. Where a set of alignment pins 80 project downward, an alignment channel is created to align or guide pusher 64 up through opening 28. Alignment channel maintains pusher 64 in proper alignment to abut against hub 64 and guides pusher 64 away from contacting top plate 31. Alignment pins 80 also act as a guide to maintain pusher 64 into alignment with hub 64 when a force is supplied and so segments 64c, 64b do not stray from alignment.

As shown in FIGS. 1-4 and FIG. 7, press 60 is positioned at a lower portion of stand 26 and upon a bottom plate 38. In one aspect bottom plate 38 is welded into position. In one aspect plate is rectangular having a length of about 16 inches and a width of about 12 inches and a thickness of about ⅜ inches. Plate 38 forms a solid base so that press 60 may impart an upward force upon hub 46. The legs 23 and bottom supports 25 of stand 22, together with the bottom plate 38 and platform 30 define an open space 88 where the press 60 is positioned and is visible. In one aspect legs 23 are tubes having a length of about 21 inches and a width and height of about 2 inches. In one aspect bottom supports 25 are tubes having a length of about 14 inches and width and height of about 4 inches. In one aspect press 60 is centered upon the bottom plate and is visible to an operator throughout operation. Hydraulic or pneumatic cords or cables, or electrical or other cords or cables which lead to the press or jack or cylinder may access the press or jack or cylinder via open space 88. Different jacks or presses 60 may be conveniently removed and added or replaced as needed. A hand-operated jack or press may also be positioned in the open space 88 for convenient hand operation. Press 60 may be mounted to bottom plate 38 if desired. In alternatives, legs 23 may extend downward beyond bottom supports 25 or bottom plate 38, yet the present arrangement provides improved lower center of gravity and stability. In further alternatives, a weldment or ring may be connected to and extend downward from top plate 31 instead of using alignment pins 80, yet the present pins 80 provided easier manufacture.

In further aspects, the invention includes a method of separating a hub 46 from a rotor 42 of a rotor/hub assembly 40, including a step of holding the rotor 42 of the rotor/hub assembly 40 at a fixed position, and utilizing a press or jack to force a pusher against a terminal end of the hub 46 to separate the hub 46 from the rotor 42. In further aspects, the step of holding the rotor 42 at a fixed position includes utilizing a plurality of clamps 50 which are devoid of moving parts. The clamps 50 hold the rotor 42 in a fixed relationship with respect to a platform 30. In further aspects, the step of utilizing a press or jack to force a pusher against the hub 46 includes pushing a top segment of the pusher where the top segment is ring-shaped and passes through the platform 30.

In operation, assembly 40 is placed upon device 20 so that hub 46 aligns with opening 28 and so that rotor 42 rests upon platform 30. Clamps 50 are rotated upward from clamp rods 59 and slid toward platform 30 so that a top arm 54 of clamp 50 is positioned over a top portion 43 of rotor 42 while a bottom arm 56 of clamp 50 is positioned beneath platform 30. Press or jack 60 is operated to force pusher 46 upward and through or within opening 28 to abut against a terminal edge of hub 46. Force from pusher 46 is continually applied while rotor 42 is held in a fixed position, thereby causing hub 46 to slide upward and to separate from rotor 42. Various shapes and sizes of assembly 40 may be separated. Device 20 may also be used to separate components of other types of assemblies which require application of a pushing force through an opening while holding one component of the assembly with a plurality of unitary clamps (clamps devoid of moving parts). The clamps 50 and device 20 are configured to allow for convenient storage of the clamps 50 during a non-use mode while accommodating quick set-up by rotating and sliding the clamps for a use mode.

It should be understood, of course, that the foregoing relates to exemplary embodiments of the invention and that modifications may be made without departing from the spirit and scope of the invention as set forth in the following claims.

What is claimed is:

1. A device for separating a hub from a rotor of a rotor/hub assembly, the device comprising:
   a platform having a top portion to receive the rotor of the rotor/hub assembly and having an opening to allow a pusher to pass therethrough to contact the hub of the rotor/hub assembly;
   a leg spanning between a lower base and the platform, the lower base and platform defining a space configured to receive a press; and
   a first clamp having a body, a top arm extending from the body, and a bottom arm extending from the body, the top arm configured to abut a top portion of the rotor while the bottom arm abuts an underside of a bottom portion of the platform in order to hold the rotor while a pusher passes through the opening to contact the hub and separate the hub from the rotor, the first clamp includes a slot, the first clamp hangs from a clamp rod positioned within the slot when in a non-use mode.

2. The device of claim 1 further comprising a press positioned on the lower base and having a ram coupled to a pusher, the pusher configured to pass through the opening to contact the hub and separate the hub from the rotor.

3. The device of claim 1 where the platform comprises an upper portion of a stand, the stand having a lower portion, a press positioned at the lower portion on the lower base, the press having a ram, a pusher coupled to the ram and positioned to pass upward into the opening.

4. The device of claim 1 further comprising a plurality of clamps, the body, top arm and bottom arm of the first clamp formed of a single piece of metal.

5. The device of claim 1 where the first clamp is slidable along the clamp rod inward toward the opening to allow the top arm to cover at least a portion of the rotor.

6. The device of claim 1 where the opening is a circular opening, the pusher having a ring-shaped cross section.

7. The device of claim 1 further comprising at least one alignment pin positioned adjacent the opening and having a longitudinal axis oriented along a direction of travel of the pusher.

8. The device of claim 1 further comprising a stand, the platform positioned at an upper portion of the stand, the stand having a lower portion, a press positioned at the lower portion, the press having a ram, a pusher coupled to the ram and positioned to pass upward into the opening.

9. The device of claim 1 where the platform has a top support defining the underside against which the bottom arm abuts, and the platform has a top plate at least in part defining the opening.

10. The device of claim 1 further comprising a hydraulic press positioned on the lower base and within the space.

11. The device of claim 1 further comprising a press positioned on a plate of the lower base, and further comprising a plurality of clamps which abut the underside of the bottom portion of the platform.

12. The device of claim 11 where the space is an open space, the press being visible upon the plate.

13. The device of claim 1 where the platform is supported by at least three legs.

14. The device of claim 1 where the first clamp is a C-shaped or U-shaped clamp, the top arm extending from the body in a first direction, the bottom arm extending from the body in the first direction.

15. The device of claim 1 further comprising a second clamp, third clamp and fourth clamp, each clamp having a body, a top arm extending from the body in a first direction and a bottom arm extending from the body in the first direction, the top arm contacting the top portion of the rotor while the bottom arm abuts the bottom portion of the platform.

16. The device of claim 1 where the pusher aligns between a plurality of alignment pins positioned adjacent the opening and having a longitudinal axis oriented along a direction of travel of the pusher.

\* \* \* \* \*